Sept. 14, 1965    C. L. BOWMAN ETAL    3,206,008
ACCUMULATIVE-TYPE CONVEYOR STRUCTURE
Filed Aug. 29, 1963    4 Sheets-Sheet 1
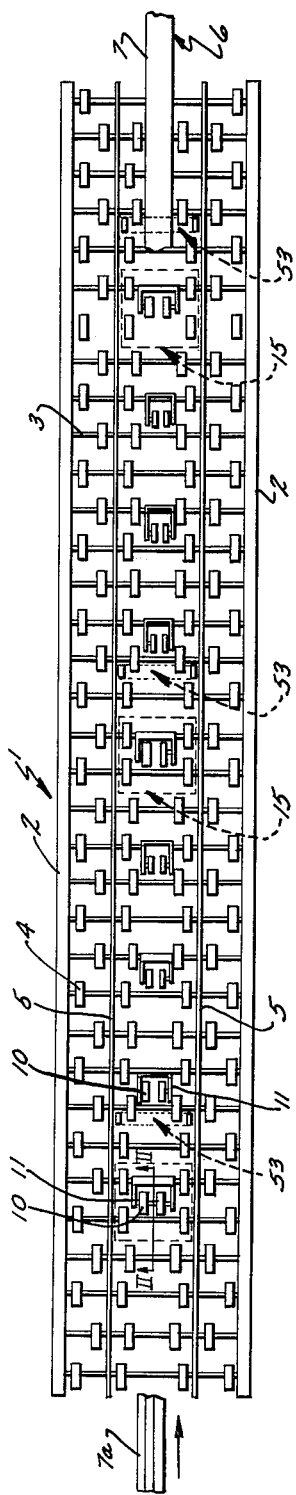
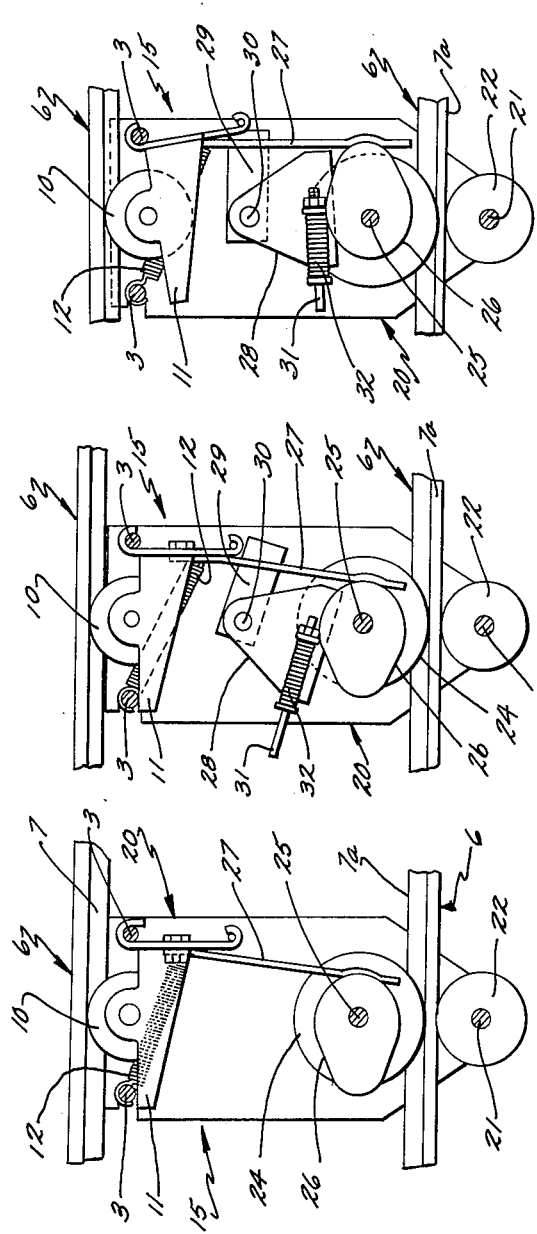
INVENTORS
CLYDE L. BOWMAN
MAYNARD J. DE GOOD
BY DONALD A. SCHNEIDER
ATTORNEYS Sept. 14, 1965   C. L. BOWMAN ETAL   3,206,008
ACCUMULATIVE-TYPE CONVEYOR STRUCTURE
Filed Aug. 29, 1963   4 Sheets-Sheet 3
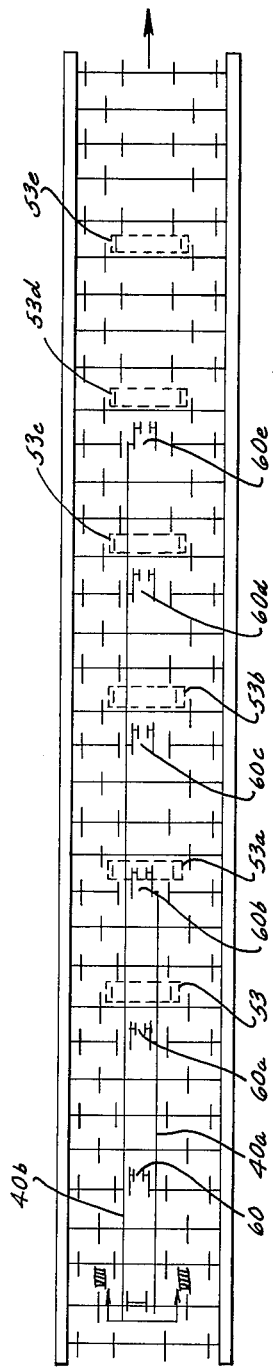
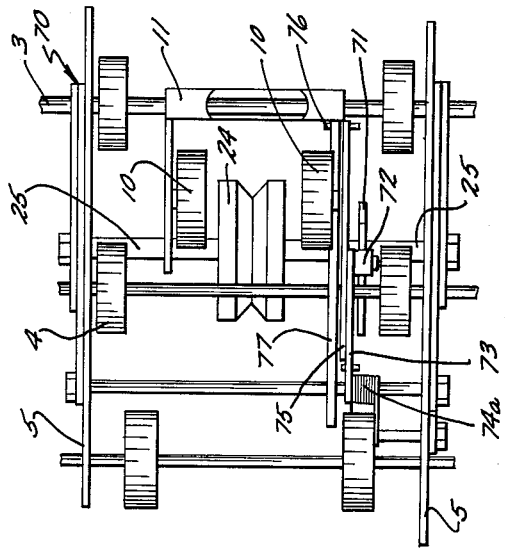
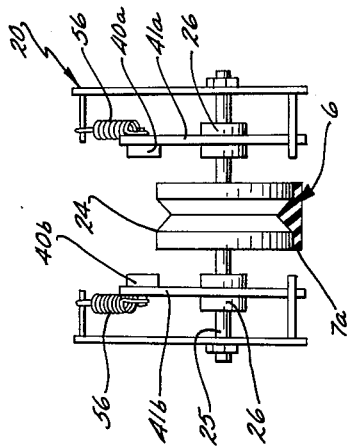
INVENTORS
CLYDE L. BOWMAN
MAYNARD J. DE GOOD
BY DONALD A. SCHNEIDER
ATTORNEYS Sept. 14, 1965 C. L. BOWMAN ETAL 3,206,008
ACCUMULATIVE-TYPE CONVEYOR STRUCTURE
Filed Aug. 29, 1963 4 Sheets-Sheet 4

INVENTORS
CLYDE L. BOWMAN
MAYNARD J. DE GOOD
BY DONALD A. SCHNEIDER

*Price & Heneveld*
ATTORNEYS

United States Patent Office 3,206,008
Patented Sept. 14, 1965

3,206,008
ACCUMULATIVE-TYPE CONVEYOR STRUCTURE
Clyde L. Bowman and Maynard J. De Good, Grand Rapids, and Donald A. Schneider, Ada, Mich., assignors to The Rapids-Standard Company, Inc., Grand Rapids, Mich., a corporation of Michigan
Filed Aug. 29, 1963, Ser. No. 305,463
16 Claims. (Cl. 198—160)

This invention relates to conveyors, and more particularly to a means by which the power available in a continuously moving endless propelling member may be tapped as the energy source for shifting the propelling member position control devices of an accumulator type conveyor. This application is a continuation-in-part application of earlier filed application, Serial No. 203,860, filed June 20, 1962 now Patent No. 3,136,406, entitled Operational Controls. It also embodies the principles of and constitutes an improvement over United States Patent Nos. 3,062,359 and 3,012,652.

It has long been recognized in the conveyor industry that powered conveyors, particularly those having an endless chain or belt, have adequate reserve power in the propelling member for operating various types of devices which may be utilized along the conveyors. The invention solves a problem which has been encountered in accumulator type conveyors. In this type of conveyor, the propelling member is supported in such a manner that it is movable toward and away from the articles to control the application of propelling force to the article.

Means are provided to sense the presence of an article and in response to this, the position of the propelling member is shifted to either effect or halt the movement of articles along the conveyor. The sensing of the articles may be done mechanically or by other means which generates a signal, such for example as interruption of a light beam or the tripping of an electrical switch. Where the sensing is mechanical, the weight of the article is normally utilized as the energy source for effecting the physical movement of the propelling member. When other means are used to sense the articles, an auxiliary power source such as a motor, air cylinder or solenoid has been provided to effect movement of the propelling member. These auxiliary power sources are expensive and require an available source of energy such as electricity or compressed air.

In those applications utilizing the weight of the article as the energy source, there is a conflict of purpose between the sensors and the actuation propelling member supporting units. If the articles are of reasonably uniform size and weight, the problem does not occur. Where, however, articles of widely varying size and weight are conveyed, the force required to support the propelling member in article propelling position must be such as to assure movement of the heavier and more bulky articles. Since the sensing units must mechanically shift the propelling member from this position, this force must be supplied entirely by the weight of the article actuating the sensing unit. In the case of the small or lightweight articles, it has been found that this force may exceed that which the article can supply with the result that the lighter articles fail to actuate the sensing unit and may become hung-up on the sensing units. In some cases, where only very lightweight articles are involved, the articles are incapable of shifting even the weight of the propelling member itself.

This invention overcomes these problems by providing a means by which the power of the propelling member itself is utilized to effect the shifting of the propelling member between propelling and non-propelling positions. The sensing units are freed of the necessity of providing this force and can be designed to operate with very light pressures. Thus, they are sensitive and can be made to operate with small, lightweight articles.

This invention provides a means of utilizing the available power in the propelling member eliminating the necessity of providing auxiliary power sources. This reduces bulk and weight. It also reduces the initial cost and subsequent maintenance of the equipment. All of these are important advantages stemming from this invention.

These and other objects and advantages of this invention will be immediately understood by those acquainted with the design and use of conveyors upon reading the following specification and the accompanying drawings.

In the drawings:

FIG. 1 is a fragmentary, plan view of a conveyor equipped with this invention;

FIG. 2 is a sectional elevational view taken along the plane II—II of FIG. 1;

FIG. 3 is a sectional elevational view similar to FIG. 2, but showing a modified form of this invention;

FIG. 4 is a sectional elevational view identical to FIG. 3, with the exception that the unit is shown in a different operating position;

FIG. 7 is a somewhat schematic plan view of a conveyor equipped with the devices of FIG. 5, but with the belt supporting means linked together in groups for operation by a single activator;

FIG. 8 is a sectional elevation view of one of the devices suitable for operating the structure illustrated in FIG. 7;

FIG. 10 is a plan view of a modified form of this invention;

Figure 5:
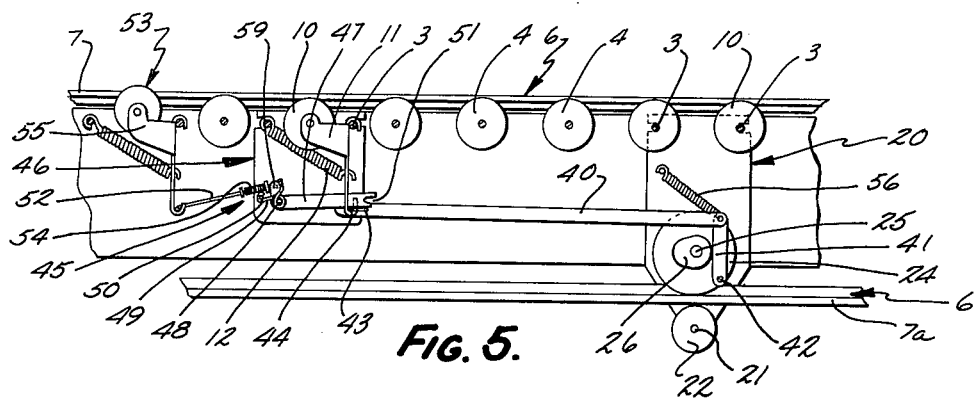
FIG. 5 is a fragmentary sectional elevational view showing a modified construction for this invention.

In executing the objects and purposes of this invention, there is provided a conveyor having a power driven endless propelling member. This propelling member may be utilized in a conveyor of a type such that it is flanked on each side by article supporting conveyor wheels which support a portion of the weight of the article, or it may be used in a power roll conveyor in which the articles are transported on rollers which in turn are driven from beneath by the propelling member. In either case, the upper run of the propelling member rests upon vertically movable supports, thereby permitting the propelling member to be shifted from an article propelling position to a retracted position in which it is disengaged from either the articles or the propelling rollers.

These supports are connected to actuators. The actuators engage and are powered by the propelling member. Each of the actuators has an eccentric device which translates the rotary motion obtained from the propelling member into reciprocating, lineal motion. This motion is transmitted to the propelling member supports and shifts them between active and retracted positions. In one form of this invention, this action is continuous, producing an oscillating type of operation. In the other forms of this invention, sensing units are provided which, when activated, hold the propelling member supports in retracted position until the sensing unit is released.

Normally, the propelling member support is biased into its active position, and power derived from the propelling member is used to shift it to retracted position. Thus, the sensing unit is relieved of the energy requirement necessary to perform this function. The energy required of the sensing unit is only that necessary to shift the latch or lock into position where it will prevent the propelling member support from shifting back to active position. Thus, the propelling member can be supported with sufficient force to assure effective transportation of heavy articles, yet, the sensing units can be made sufficiently sensitive that they operate readily with light articles. This invention divorces the function of physically moving the propelling member supports from the function of holding them in retracted position once they have been moved.

FIG. 1 of the drawings illustrates a conveyor 1 of conventional construction having side rails or frame members 2 connected by axles 3. Rotatably mounted on the axles at suitable spacings are article supporting wheels 4. The wheels 4 form an article supporting and conveying surface.

Paralleling the frame members 2 and spaced inwardly of them are a pair of parallel reinforcing straps 5. Mounted at the center of the conveyor is a powered propelling member or belt 6. A fragmentary portion of the forward or upper run 7 of this propelling member is shown on the right hand side of FIG. 1, and a fragmentary portion of the lower or return run 7a of the propelling member is shown on the left hand side of FIG. 2. The direction of movement of the propelling member is indicated by the arrows. It will be recognized that the propelling member passes over terminal pulleys at each end of each run and has some type of conventional power equipment to drive it. These are not illustrated inasmuch as they are conventional and many types of equipment are available for this purpose.

At spaced intervals along the conveyor, the upper run 7 of the propelling member is supported by wheels 10. Except for the terminal pulleys, these wheels serve as the sole support for this portion of the propelling member. The wheels 10 are mounted on hangers 11 which in turn are pivotally mounted on the axles 3. As shown in FIG. 2, these hangers are urged into raised position by a spring 12. The upward movement of the hangers under the bias of the spring 12 is limited by contact between the end of the hanger and an adjacent axle 3 (FIG. 2). The hangers 11 may be operatively independent or connected together in groups for simultaneous operation by suitable mechanical linkages.

The hangers 11 are pivoted downwardly to drop the propelling member. This action is governed by sensing units 53 located at periodic intervals along the conveyor. Each sensing unit has a portion projecting above the conveying surface which is depressed by articles passing over it. Means are provided to connect the sensing units 53 to the hangers 11. The structure so far described is old and is disclosed in United States Patent 3,062,359.

In the particular structures described in this disclosure mechanisms are utilized which transmit the information provided by the sensing units and execute the actual shifting of the hangers 11. These mechanisms are the subject matter of this invention.

Depending from the axle 3 at periodic intervals along the conveyor are actuation members or powered take-off units 15, each having a frame assembly 20 (FIGS. 1 and 2). These constitute part of the actuating mechanism. The lower end of each frame assembly mounts a shaft 21 which rotatably supports a wheel 22. The wheels 22 are beneath and support the return run 7a of the propelling member. They hold the return run of the propelling member up against the power take-off wheel 24, which in turn, is rotatably mounted on the shaft 25. The shaft 25 is rotatably journaled in the frame assembly 20. In the particular construction illustrated, the propelling member has a central rib which rides in a central circumferential channel of the wheel 24.

Also mounted on the shaft 25 is an eccentric cam 26. The cam cooperates with the lever 27 which is secured to and projects downwardly from the hanger 11. By reason of the bias of the spring 12, the hanger is held in a normally active or raised position, and the lever 27 is held against the cam 26. The shape of the cam 26 is such that each time the portion of the cam with greater radius passes the lever 27, the lever will be swung outwardly from the shaft 25 swinging the hanger 11 down, dropping the propelling member 6 to inactive or disengaged position. Thus, the upper run 7 of the propelling member 6 will be lowered once on each revolution of the power take-off wheel 24. It will be obvious that if the cam is designed with two projecting portions, the number of times the propelling member is lowered will be doubled for each revolution of the power take-off wheel 24. It will also be recognized that a speed reducer may be installed between the wheel 24 and the cam 26 which will reduce the speed of the cam to one revolution for several revolutions of the wheel.

In this particular construction, no sensing unit is provided and, thus, a pulsating type of conveyor is created. The cam will operate continuously and the propelling member will shift in response to every revolution of the cam. Such conveyors have important applications in the transport of certain types of articles.

FIGS. 3 and 4 illustrate the same general mechanism as is shown in FIG. 2, except that a lock or latching device has been added. The operation of this locking latch is governed by a sensing unit.

The latch includes the plate 28 and a stop arm 29 which are connected together for simultaneous movement. They are supported for pivotal movement by the pivot 30. When the rod 31 is shifted to the left as illustrated in FIG. 3, the stop arm 29 is lowered to permit the lower end of the hanger to swing above and pass it without interference. Thus, the hanger is free to pivot to its full oscillating cycle each time the lever 27 is contacted by the cam member 26.

The rod 31 is connected to a normally raised sensing unit 53. This sensing unit has conveyor wheels which project slightly above the plane of the conveying surface of the conveyor where they will be contacted and depressed by the movement of an article over them. Bias means such as a spring holds the sensing unit in raised position and the rod 41 shifted to the left as illustrated in FIG. 3. While the sensing unit is not illustrated in either FIGS. 3 or 4, it is identical with the sensing unit 53 shown in FIG. 5, except that it is biased to its raised position by a spring similar to spring 12. This biasing spring functions in the same manner as the spring 12. The bias of the spring on the sensing unit 53 also biases the latch assembly into its normally lowered position as illustrated in FIG. 3 by means of a connecting rod 31. When the sensing unit is depressed, the arm is shifted to the right as illustrated in FIG. 4. This shifts the stop arm 29 upwardly, bringing the end of the stop arm into the path of movement of the lower end of the hanger 11.

The hanger 11, once caught behind the end of the raised stop arm 29, will be prevented from returning to its normal position until the stop arm is lowered. When the hanger 11 is engaged by the stop arm 29, the wheel 10 is held in lowered position, disengaging the propelling member 6 from the articles.

The spring 32 by which the end of the connecting rod 31 is secured to the plate 28 provides an override action. Should the sensing unit be lowered, shifting the connecting rod 31 to the right while the hanger 11 is raised, the hanger 11 will prevent the stop arm 29 from swinging upwardly. Under these circumstances, the spring 32 will compress permitting the rod to shift without damage to the mechanism, and without significantly increasing the pressure necessary to depress the sensing unit 53.

The stop arm 29 will be released to rise upon the next rotation of the cam member 26, when it shifts the lever 27 to the right. Once the stop arm 29 is freed, the spring 32 will automatically raise it. The raised stop arm 29 holds the hanger 11 and the lever 27 in a position which is just short of the extreme position to which the lever is shifted by the cam member 26. Thus, on each rotation of the cam, the hanger 11 shifts away slightly from the end of the stop arm 29. So long as the sensing unit is depressed, the stop arm will remain up, but as soon as the sensing unit is released and returns to its original position, the stop arm will be free to drop into its lowered position the next time the cam passes the lever 27 and releases the bind between the hanger and the end of the stop arm 29.

Figure 6:
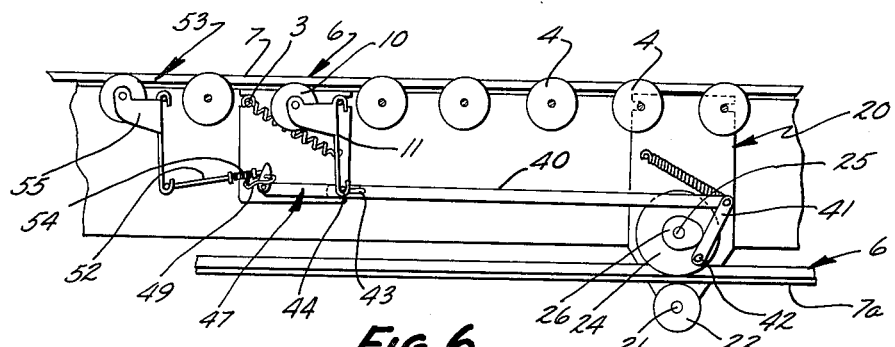
FIG. 6 is a fragmentary sectional elevational view similar to FIG. 5, but showing the structure in a different operating position.

FIGS. 5 and 6 illustrate another mechanism by which the same functions and results can be performed as that obtained by using the structure illustrated in FIGS. 3 and 4. This assembly again includes the frame assembly 20, the shaft 25, and the power take-off wheel 24. This wheel contacts and is driven by the lower run 7a of the propelling member 6. The shaft 25 also mounts an eccentric cam 26. The assembly includes an oscillating rod 40 which is pivotally connected to one end of the rocker arm 41. The other end of the rocker arm is secured to a fixed pivot stud 42. It will be seen that on each revolution of the shaft 25, the eccentric cam 26 will rock the rocker arm 41 about the pivot stud 42, shifting the rod 40 back and forth, thus giving it an oscillating motion.

The other end of the oscillating rod 40 has slot 43 elongated lengthwise of the rod. Passing through this slot 43 is a pin 44. This pin is secured to the lower end of a hanger 11. The hanger is biased into normally raised position by a spring 12, thus holding the pin 44 to the right or the position illustrated in FIG. 5.

Associated with the hanger 11 is a latch mechanism 45 having a frame assembly 46. The latch mechanism includes a generally L-shaped locking finger 47 pivotally mounted on the stud 48 at the juncture between the legs of the L. The free end of the long arm of the locking finger 47 is biased into normally raised position by the wrap spring 49, one end of which engages the short leg of the locking finger, and the other end engages a fixed pin 50. The free end of the locking finger 47 is notched on its lower side forming a recessed pocket 51. The shape and size of the pocket 51 is such that it will receive and hold the pin 44. A rod 52 connects the sensing unit 53 to the free end of the short leg of the locking finger 47. The connection to the locking finger is made through a spring 54 which provides an override connection. Thus, the sensing unit 53 may be depressed or raised even though the locking finger 47 is temporarily restrained from following the movement of the rod 52.

As illustrated in FIG. 5, the normal position of the locking finger 47, under the bias of the spring 49, is such that it is positioned above the pin 44 and the pin travels with the oscillating rod 40 without interference from the locking finger. Due to the action of the cam 26, the rod 40 is oscillated, and by reason of the engagement of the pin 44 with the right hand end of the slot 43 as the device is illustrated in FIG. 5, the pin will be forced to travel with the rod. This lowers the pressure wheels 10 by reason of the resulting swinging motion of the hanger 11. As the cam releases the rod 40, the bias of the spring 12 will swing the hanger to the right, pulling the rod 40 and the rocker arm 41 with it.

However, when an article passes over the sensing unit 53, depressing it, and thus swinging the hanger 55 of this unit to the left, the rod 52 will also be moved to the left. If the hanger 11 is in the position illustrated in FIG. 5, the spring 54 will be compressed, putting a bias on the locking finger 47 to shift it downwardly as soon as it is free to do so. When this condition exists, on the next stroke of the rod 40 to the right, the pin 44 will be moved to a position below the pocket 51 permitting the locking finger to drop. Once the locking finger has dropped, it will restrain the pin 44 from returning to its normal position. By reason of the slot, however, the rod 40 may continue to follow the cam 26 and shift to the left. The length of the slot 43 is such that the rod may pass the full length of its stroke without interference with the pin, thus providing for this particular circumstance, a lost motion connection. The position of the mechanism as just described is illustrated in FIG. 6.

In order to assure movement of the rod 40 and the rocker arm 41 with the cam 26, a light spring 56 may be provided biasing the rocker arm 41 into constant contact with the cam. The position of the pocket 51 is such that the movement of the rod 40 to the left moves the pin 44 out of the pocket 51 at the end of each stroke. If the sensing unit is still depressed nothing will happen. However, if the sensing unit 53 has been relieved, shifting the rod 52 once again to the right, the locking finger 47 will be biased upwardly and will so move as soon as the restraining effect of the pin 44 is eliminated. Thus, as soon as the pin 44 is shifted out of the pocket 51, the biased locking finger 47 will snap up to its original or retracted position. This frees the hanger 11 to shift to its active or raised position as the rod 40 oscillates to the right.

FIGS. 7 and 8 illustrate the application of the mechanism of FIGS. 5 and 6 to a plurality of propelling member supports and sensing units, utilizing only a single activating assembly. In this case, the activating assembly as shown in FIG. 8 has the shaft 25 and power take-off wheel 24 driven by the lower or return run 7a of the propelling member 6. However, the shaft 25 mounts a pair of cams 26, one on each side of the power take-off wheel 24. One of the cams drives a rocker arm 41a and its associated oscillating rod 40a. The other cam drives the second rocker arm 41b and its associated oscillating rod 40b.

As is schematically shown in FIG. 7, the oscillating rod 40a is connected to three pressure wheel assemblies 60, 60a and 60b. These each have pressure wheels 10 and hangers 11, together with a latching mechanism 45. In this case, each of the latching mechanisms is operated by a separate sensing unit 53. The sensing unit 53 controls the propelling member support unit 60, the sensing unit 53a controls the propelling member supporting unit 60a, and the sensing unit 53b controls the propelling member supporting unit 60b. By reason of the lost motion connection provided at each of the propelling member supporting units by the slot 43, each of the propelling member supporting units may be separately held in depressed or inactive position without in any way interfering with the operation of other similar units operatively connected to the oscillating rod 40a.

The oscillating rod 40b is connected to the propelling member support units 60c, 60d, and 60e. These in turn are monitored by the sensing units 53c, 53d, and 53e, respectively. Thus, a single activating unit may be utilized to operate five, ten or even greater lengths of conveyor. This simplifies the structure and reduces the cost.

Figure 9:
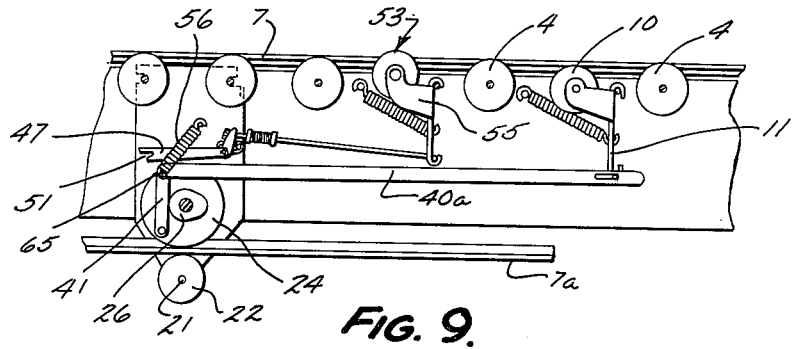
FIG. 9 is a section elevation view of a modified actuator for a conveyor of the type illustrated in FIG. 7.
Figure 6A:
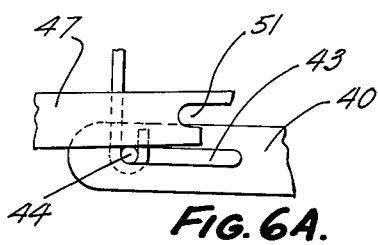
FIG. 6A is a fragmentary, enlarged view of a portion of the locking mechanism.

FIG. 9 illustrates a way in which this invention may be applied to a number of simultaneously operated propelling member support units utilizing a single sensing unit. In this case, the latching mechanism 45 is shifted from association with the individual belt supporting unit to association with the activating unit. A pin is provided at the pivot between the oscillating rod 40a and the rocker arm 41. This pin 65 is adapted to engage the pocket 51 in the end of the locking finger 47 when the locking finger 47 is biased downwardly. This holds the rod 40a in retracted position, and the rocker arm 41 out of contact with the cam except during the last portion of the leftward stroke. When the pin 65 is engaged in the pocket 51, all of the hangers connected to the oscillating rod 40a will be held in depressed position. The contact between the cam and the rocker arm 41 at the end of the stroke will be sufficient to relieve the bind between the pin 65 and the pocket 51 permitting the locking finger 47 to snap up to its retracted position when the sensing unit has been relieved.

It will be recognized that such an arrangement could be applied to the type of structure shown in FIGS. 5 and 6 with the rods 40a and 40b being controlled by different sensing units. It will also be recognized that if it is desired to operate the hangers associated with the rod 40 alternately to the operation of the hangers associated with the rod 40b, this may be easily accomplished by shifting one of the cams 26 to a 180° position with relation to the other.

Figure 11:
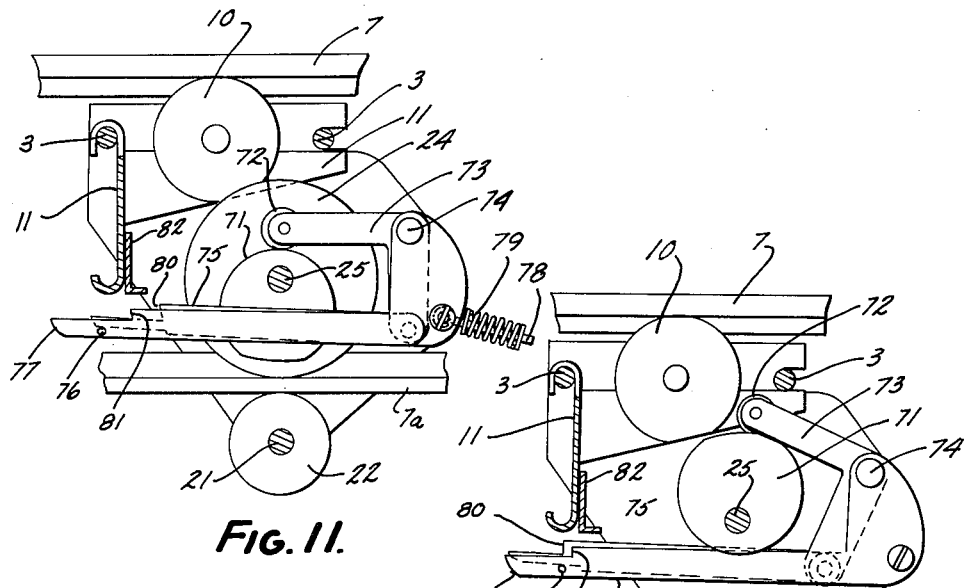
FIGS. 11, 12, 13 and 14 are all sectional elevation views showing the mechanism of FIG. 10 in progressive stages as it passes through an operating cycle.

FIGS. 10 through 14 illustrate still a different mechanism for carrying out the basic principles of this invention. In this structure, there is an actuator frame assembly 70 which is hung from the axles 3 and the reinforcing straps 5 as best seen in FIG. 10. The frame assembly 70 mounts a shaft 25 on which is a power take-off wheel 24 engaging the lower run of the propelling member 6. This is best seen in FIG. 11. Secured to the shaft 25 is a cam member 71. The cam member 71 is engaged by a follower 72 mounted on the end of an L-shaped lever 73. At the juncture of the legs of the L-shaped lever it is pivotally mounted on the pin 74, and the lever is biased to hold the follower against the cam by a spring 74a. The end of the lever 73 opposite from the follower 72 is pivotally secured to a bar 75. The free end of the bar 75 is slidably supported on a pin 76 which in turn is mounted on the end of a support arm 77. The opposite end of the support arm has an upstanding leg, the upper end of which is pivotally mounted on the pin 74. Below the pin 74, an actuating rod 78 is pivotally connected to the support arm 77. The connection is made through the spring 79 providing an override connection.

The free or left hand ends of both the bar 75 and the support arm 77 are recessed to form an upwardly opening notch. Thus, the bar has a notch 80 and the support arm, a notch 81. Immediately above the notches 80 and 81, a projection 82 is mounted on the lower end of the hanger 11.

Figure 12:
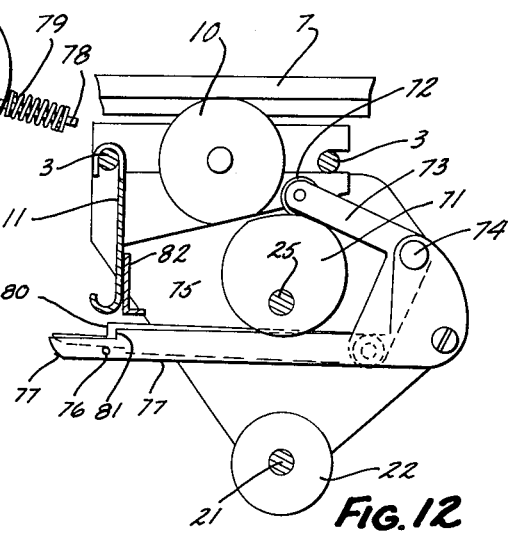

The other end of the actuating rod 78 is connected to a suitable sensing unit such as the sensing unit 53 illustrated in FIG. 5. When this sensing unit is in raised position, the support arm 77 is pivoted to its lowered position. In this position, the arm is below the lower end of the hanger and the arm 82. The slidably supported bar 75 is also below the lower end of the hanger 11 and the projection 82. Thus, as the bar 75 is oscillated by the cam 71, the bar will travel beneath the projection 82 without contacting it (FIG. 12).

Figure 13:
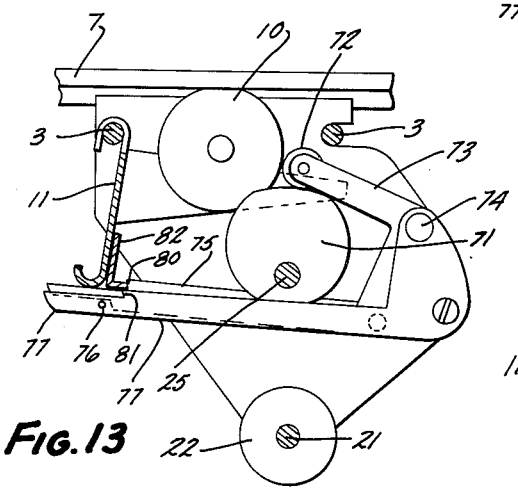
Figure 14:
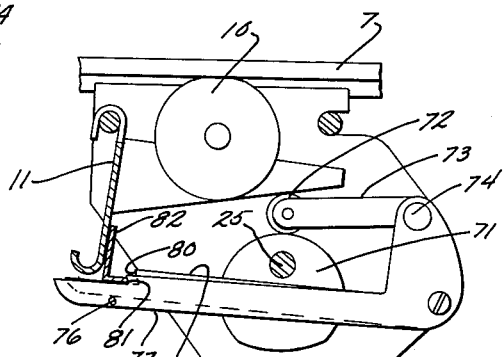

However, if the sensing unit is depressed, the actuating rod 78 is forced to the left, as the unit is illustrated in FIG. 11. This movement, by virtue of the fact that the support arm is mounted on the pivot pin 74, causes the free or notched end of the support arm 77 to swing upwardly where it will engage the hanger arm 82. If the hanger is in its raised position when this action occurs, the bar 75 and the support unit 77 will be forced up against the bottom of the arm 82, but by virtue of the override connection created by the spring 79, the sensing unit may make a full movement despite this interference. When the cam shifts the bar 75 to its retracted position or to the right as illustrated in FIG. 11, the back wall of the notch 80 will be in a position to engage the projection 82 when the cam next shifts the bar 75 to the left (FIG. 13). As the cam shifts the bar 75 to its maximum extended position, the hanger 11 will be pivoted, lowering the wheels 10 and dropping the upper run 7 of the propelling member 6. In the extreme extended position, the projection 82 is carried into the area of the notch 81 of the support arm 77. As the bar 75 retracts, the projection 82 will be engaged by the notch 81. Thus, the propelling member supporting wheels 10 will be held in lowered position. This condition will remain until the sensing unit is relieved and shifts to raised position. When this occurs, the support arm 77 will once more be pivoted downwardly, releasing the hanger 11.

While the support arm 77 is in its raised position, the reciprocation of the bar 75 once, during each cycle of the cam 71, pushes the projection 82 slightly away from the end wall of the notch 81. This relieves any bind between the arm 82 and the support arm, permitting the support arm 77, if freed by the sensing unit, to drop.

Figure 15:
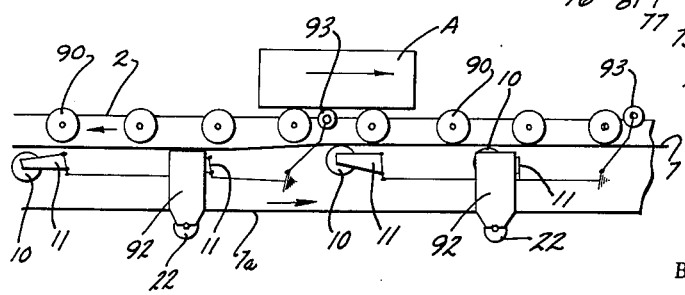
FIG. 15 is a fragmentary somewhat schematic sectional elevation view illustrating the application of this invention to a power roll type conveyor.

FIG. 15 schematically illustrates the fact that this invention can be applied with equal facility to a power roll conveyor. The only difference is that the units, instead of being mounted beneath a propelling member positioned at the conveying surface, and thus making contact with the articles, are mounted beneath a propelling member which when raised in active position, contacts rollers which in turn support and propel the articles. In this case, the driven rollers 90 which support the articles, such as the article A, are driven by the upper run 7 of an endless propelling member, which in turn is supported by the pivoted hangers 11. The position of these hangers is controlled by an actuating unit 92 which in turn is regulated by a sensing unit 93. The actuating unit may be of any of the several types which have previously been described. It will be understood that the structure of the actuating units and their method of operation having been disclosed, the application of them to a power roll conveyor of the type shown in FIG. 15 is merely a matter of mechanical adaptation.

This invention provides a simple, relatively inexpensive and dependable means for regulating the operation of the propelling member in response to the presence of articles on the conveyor. While it performs the basic functions initially illustrated in U.S. Patent 3,062,359, it executes these principles in a more sophisticated manner. In so doing, it provides such conveyors with a greater range of capacity, particularly in handling articles of widely varying sizes and weights. Thus, it increases the range of activities to which such conveyors can be applied. It also permits a fewer number of standardized conveyor constructions to be used to meet the requirements of most users.

It also introduces the possibility of making conveyors of this type function either as an accumulator or as a pulsating conveyor. In the latter, motion is imparted to the article for only a portion of the total time the article is on the conveyor. It permits substantial lengths of conveyor to be handled simultaneously because the energy requirement imposed upon the sensing unit is not proportional to the energy required for support of the propelling member to assure efficient transportation of the articles.

While several embodiments of the principles of this invention have been illustrated and described, it will be recognized that other embodiments and modifications of this invention, all of which incorporate the principles of the invention, can readily be made in the light of this disclosure. All of these modifications embodying the principles of this invention are to be considered as included in the hereinafter appended claims, unless these claims expressly state otherwise.

We claim:

1. In a conveyor for articles having an endless driven article propelling member, said propelling member having a forward run and a return run; a pivotally mounted support element for said forward run of said propelling member, said support element being movable to shift said propelling member from an article propelling position to an article non-propelling position; an actuation member having a wheel engaging and rotated by said propelling member; said actuation member having a radially extending cam element; said support element having a lever means engaged by said cam element, said lever means being oscillated toward and away from said actuation member by said cam element as said actuation member rotates for shifting said propelling member alternately between said positions.

2. In a conveyor for articles having an endless driven article propelling member, said propelling member having a forward run and a return run; a pivotally mounted support element for said forward run of said propelling member, said support element being movable to shift said propelling member from an article propelling position to an article non-propelling position; an actuation member having a wheel engaging and rotated by said propelling member; said actuation member having a radially extending cam element; a lever secured to said support element for moving said support element to each of said positions when said lever is oscillated; said lever being engaged by said cam element and oscillated toward and away from said actuation member by said cam element as said actuation member rotates for shifting said propelling member alternately between said positions.

3. In a conveyor for articles having an endless driven article propelling member, said propelling member having a forward run and a return run; a pivotally mounted support element for said forward run of said propelling member, said support element being movable to shift said propelling member from an article propelling position to an article non-propelling position; an actuation member having a wheel engaging and rotated by said propelling member; said actuation member having a radially extending cam element; a lever secured to said support element for moving said support element to each of said positions when said lever is oscillated; said lever being engaged by said cam element and oscillated toward and away from said actuation member by said projection as said actuation member rotates for shifting said propelling member alternately between said positions; a sensing element adapted to be activated by articles moving along said conveyor; a stop connected to said sensing element, when said sensing element is actuated by an article, said sensing element moving said stop into engagement with said support element and holding said lever away from said actuation member, said stop being moved out of engagement with said support element upon deactivation of said sensing element.

4. In an article transporting conveyor having a power driven propelling member and movable support means supporting said propelling member for movement between article propelling and article release positions and an activator effecting the movement of said movable means, said activator comprising: power means engaging and rotated by said propelling member; a bar and means driven by said power means to reciprocate said bar; a lost motion connection between said bar and said support means; said bar moving said support means to article release position during a position of each cycle of reciprocation; a locking member shiftable between retracted and active positions; means for shifting said locking member between said positions; said locking member when shifted to active position holding said support means in article release position and said lost motion connection permitting said bar to reciprocate while said support means remains in said article release position.

5. A device as recited in claim 4 wherein said propelling member is an endless driven member and said means for reciprocating said bar has a wheel contacting and constantly driven by said propelling member.

6. A device as recited in claim 5 wherein a rotatable cam is provided; said bar engaging said cam and being reciprocated by the rotation of said cam.

7. A device as recited in claim 5 wherein a plurality of said movable support means are provided each having a separate lost motion connection with said bar; a plurality of said locking members each operatively independent of the others; said means for shifting said locking members being a sensor responsive to the presence of an article in contact therewith, one of said means being provided for each of said locking members; both said locking members and said sensors being spaced apart lengthwise of the conveyor.

8. A device as recited in claim 7 wherein each of said sensors is spaced lengthwise of the conveyor from the locking member with which it is operatively associated.

9. A device as recited in claim 5 wherein said means for shifting said locking member has a sensor responsive to the presence of an article in contact therewith and when an article is in contact therewith shifting said locking member to active position.

10. A device as recited in claim 5 wherein said locking member when shifted to active position holds said support means at a point near but short of the end of the stroke of said bar and said bar during each reciprocation shifts said support means to disengage it from said locking member.

11. A device as recited in claim 10 wherein said support means is biased into article propelling position and by said bias holds said locking member in active position and said locking member when released by said shifting means may move to retracted position upon disengagement by said support means.

12. In an article transporting conveyor having a power driven propelling member and movable means supporting said propelling member for movement between article propelling and article release positions and an activator effecting the movement of said movable means, said activator comprising: a wheel engaging and rotated by said propelling member; a bar and means driven by said wheel to reciprocate said bar; a support member for said bar and control means for shifting said support member and bar from a first position to a second position; an element on said bar for engaging said movable means and moving it as said bar is reciprocated; a control element for shifting said support member and bar between said first and second positions; said element on said bar engaging said movable means when said bar is in said second position and being spaced from said movable means when said bar is in the said one position.

13. A device as recited in claim 12 wherein said control means shifts said support member and bar vertically; said element on said bar passing beneath said movable means when said support member is in said first position and when said support member is raised to said second position, said element engaging said movable means.

14. A device as recited in claim 12 wherein said support member has a locking member; said locking member engaging said movable means when said support member and bar are in said second position and holding said movable means in article release position.

15. A device as recited in claim 14 wherein said locking member holds said movable means at a point near but short of the end of the stroke of said bar and said bar during each reciprocation shifts said movable means to disengage it from said locking member.

16. In an article transporting conveyor having a power driven propelling member and movable means supporting said propelling member for movement between article propelling and article release positions and an activator controlling the movement of said movable means, said activator comprising: an eccentric cam and drive means engaging said propelling member to rotate said cam; a lever and a pivot supporting said lever for rocking movement; said lever having one end engaging and following said cam whereby said lever is rocked in response to the rotation of said cam; said lever having a bar pivotally secured to the other end thereof, said bar being notched at the end opposite from said lever; a support arm mounted on said pivot and being notched at the end remote from said pivot, the notched end of said bar and support arm being adjacent each other; a pin on said support arm adjacent said notched end slidably supporting said bar; actuating means for rocking said support arm between active and retracted positions; in retracted position said notched end of said bar and support arm being disengaged from said movable support means and in active position said notched end of said bar engaging said movable support means to shift said movable support means to article release position as said lever is rocked by said cam; said notched end of said support means engaging said movable support means when shifted to article release position and holding it in said position so long as said support means is shifted to active positions.

References Cited by the Examiner
UNITED STATES PATENTS 3,136,406   6/64   De Good _____ 198—127

SAMUEL F. COLEMAN, *Primary Examiner.*

ERNEST A. FALLER, *Examiner.*